(12) United States Patent
Cook

(10) Patent No.: US 8,024,556 B1
(45) Date of Patent: Sep. 20, 2011

(54) LAYERED EXECUTION PRE-BOOT CONFIGURATION SYSTEMS, APPARATUS, AND METHODS

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 842 days.

(21) Appl. No.: 12/058,785

(22) Filed: Mar. 31, 2008

(51) Int. Cl.
*G06F 9/44* (2006.01)

(52) U.S. Cl. ............... 713/1; 713/2; 707/822; 707/823; 717/120; 717/121; 717/162; 717/170

(58) Field of Classification Search .................. 713/1, 2; 707/822, 823, 828; 717/120, 121, 162, 170
See application file for complete search history.

(56) References Cited

U.S. PATENT DOCUMENTS

| 7,117,495 | B2 * | 10/2006 | Blaser et al. | 717/174 |
|---|---|---|---|---|
| 7,657,419 | B2 * | 2/2010 | van der Made | 703/22 |
| 7,877,413 | B1 * | 1/2011 | Cook et al. | 707/783 |
| 7,886,291 | B1 * | 2/2011 | Jones et al. | 717/174 |
| 2003/0233490 | A1 * | 12/2003 | Blaser et al. | 709/328 |
| 2005/0169073 | A1 * | 8/2005 | Cook et al. | 365/202 |
| 2005/0172279 | A1 * | 8/2005 | Cook et al. | 717/162 |
| 2006/0064683 | A1 * | 3/2006 | Bonsteel et al. | 717/162 |

* cited by examiner

*Primary Examiner* — M Elamin
(74) *Attorney, Agent, or Firm* — Advantedge Law Group

(57) ABSTRACT

The disclosure is directed to systems, apparatus, and methods for layered execution pre-boot configuration. In one example, a system includes a local computer, a base operating system, a layered execution environment, and a layered environment manager. The system may further include an environment update service and one or more layered environment data store(s). The system may, before booting the base operating system and layered execution environment, perform such modification operations as applying an operating system patch, applying a program patch, changing a layer activation property, disabling a program, replacing a program, changing a configuration file, and installing a driver.

20 Claims, 5 Drawing Sheets

LAYERED EXECUTION PRE-BOOT CONFIGURATION SYSTEMS, APPARATUS, AND METHODS

BACKGROUND INFORMATION

A traditional view of virtualization involves executing one or more virtual machines on a server, with each virtual machine running one or more applications. Often, each application is presented with its own operating environment via a dedicated virtual machine. The virtual machines that execute on a computing system prevent conflicts between applications as well as between applications and an operating system.

Virtual machines alleviate some of the compatibility problems between applications and associated libraries and drivers, but because of their complexity may require additional maintenance from IT personnel. Not only is there the base operating system to be maintained, but also the infrastructure of the virtual machines and potentially incompatible programs.

BRIEF DESCRIPTION OF THE DRAWINGS

Various embodiments are described with reference to the accompanying drawings, wherein like reference numbers designate like elements, and in which.

DETAILED DESCRIPTION

Figure 1:
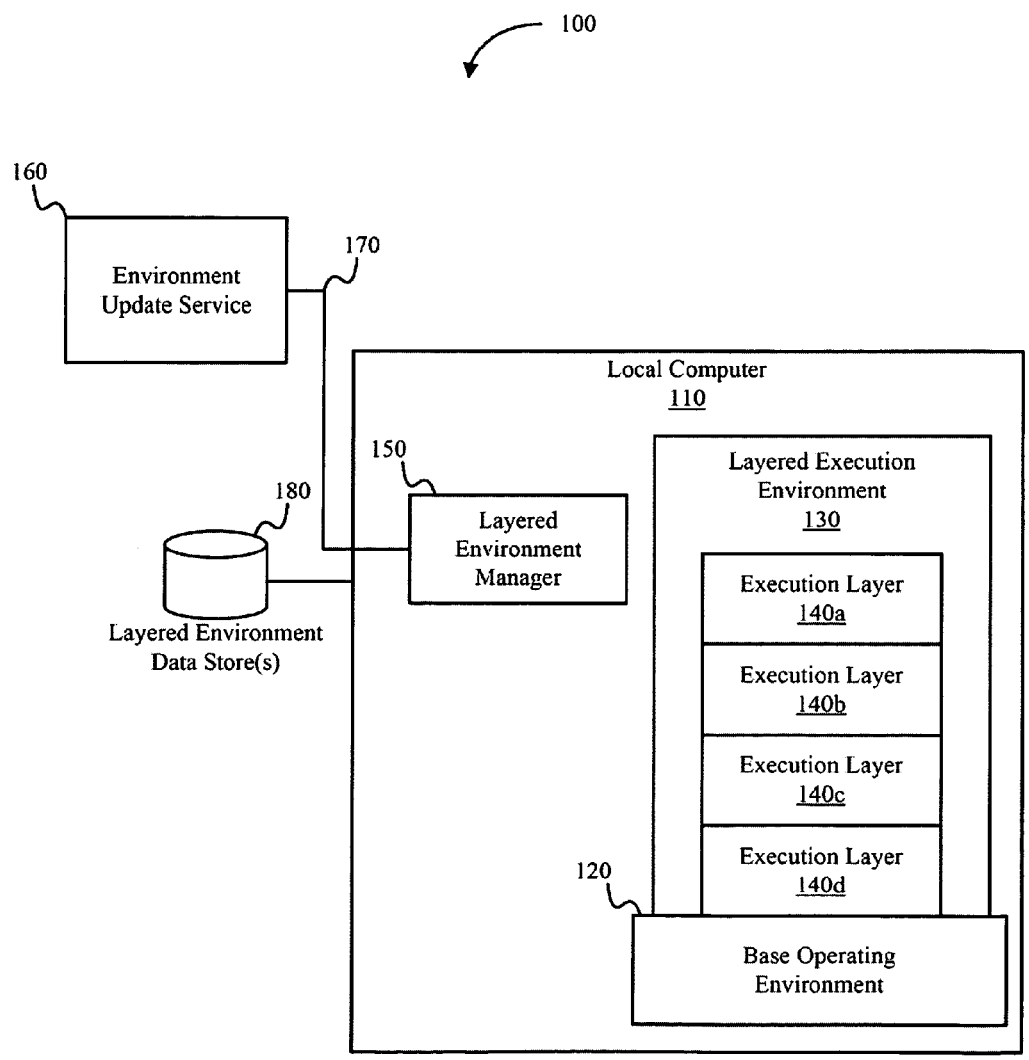
FIG. 1 illustrates one embodiment of a computing system configured for layered execution pre-boot configuration.

The disclosure is directed to systems, apparatus, and methods for layered execution pre-boot configuration.

It should be appreciated that the examples disclosed herein can be implemented in numerous ways, including as one or more processes, apparatuses, systems, devices, methods, computer readable media, or computer program products embodied on computer readable media.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

Exemplary systems, apparatus, and methods for layered execution pre-boot configuration are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

One approach to application virtualization utilizes a layering technology to enable an application, software data, or other resources to be installed on one or more layers. The layers can be overlaid on an operating environment such that the contents of the layers appear to be installed on the computing system even though the base operating environment is not modified by installation files, registry settings, or the like. Many layers can be overlaid on an operating environment. Each layer can be comprised of sub-layers (e.g., Read-Only and Read/Write layers). Read-only layers can only be read from. Read/write layers can be written to as well as read from. These two layer types may mimic permissions of the same type in a typical file system. Virtualization may be performed in any of the ways described in U.S. Pat. No. 7,162,724, filed Jun. 11, 2003, and U.S. patent application Ser. No. 11/324,565 filed Jan. 3, 2006, the disclosures of which are hereby incorporated by reference in their entirety.

The combination of layers and a base operating environment appears as a seamless system to an end user. Changes to the base operating environment by inclusion of a layer are aggregated by the file system through a "filter" driver. From the perspective of an application and the operating system, the aggregated layers are indistinct from a non-layered operating environment. A layer can either be inactive (i.e., not in use) or active (i.e., in use). When a layer is active, all contents of the layer may be viewed and accessed.

In one example, a system is presented for layered execution pre-boot configuration. The system may include a local computer, a base operating system, a layered execution environment, and a layered environment manager. The system may further include an environment update service and one or more layered environment data store(s).

Layered execution pre-boot configuration systems, apparatus, and methods disclosed herein can improve stability and security of a layered execution environment. For example, a bug in a driver or other program may put a computer system into an endless reboot cycle. The cycle may be broken by reconfiguring or patching the defective software, or by deactivating the execution layer containing it before booting.

A system can be protected against so-called "zero-day exploits" by applying a security patch to the base operating environment or the layered execution environment before booting. The patch is applied before the base operating system is booted and vulnerable to being compromised by malware such as viruses, worms, trojan horses, rootkits, or spyware.

Turning now to the drawings, FIG. 1 illustrates one embodiment of a computing system 100 (or simply "the system 100") configured for layered execution pre-boot configuration. As shown, the computing system 100 includes a local computer 110, a base operating environment 120, a layered execution environment 130, execution layers 140a-d, a layered environment manager 150, an environment update service 160, an environment modification 170, and one or more layered environment data stores 180. The system 100 facilitates layered execution pre-boot configuration. For example, components of the layered execution environment may be patched, disabled, or replaced, configuration files may be changed, drivers installed, or execution environment layers may be activated or deactivated, without booting the layered execution environment or its base operating environment.

In certain embodiments, components of the computing system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While one embodiment of a computing system 100 is shown in FIG. 1, the components illustrated in FIG. 1 are not intended to be limiting. Indeed, additional or alternative components, implementations, or computing systems may be used to implement the principles and processes described herein.

As depicted in FIG. 1, the local computer 110 may include a base operating environment 120, a layered execution environment 130, and a layered environment manager 150. The base operating environment 120 may be a computer operating system, including, but by no means limited to, known versions and/or varieties of Microsoft Windows®, UNIX, Macintosh®, or Linux® operating systems. In one embodiment, the layered execution environment 130 is the Altiris® Software Virtualization Solution™

The layered execution environment 130 may include one or more execution layers 140, depicted in FIG. 1 as execution layers 140a-d. Portions of the layered execution environment 130 may be located external to the local computer 110. The execution layers 140 may contain one or more programs that may be executed within the layered execution environment 130. An execution layer 140 may include data files related to a program installed in the execution layer 140. Execution layers 140 may be deactivated, for example, to deactivate a program in an execution layer 140 that interferes with the operation of the local computer 110.

The layered environment manager 150 manages the layered execution environment 130. Environment modifications 170 that may be performed by the layered environment manager 150 include disabling a program; replacing a program; installing a program patch; modifying a configuration file; installing, removing, or updating a driver; installing an operating system patch; and activating or deactivating an execution layer 140. In various embodiments, the layered environment manager 150 may be a BIOS-based utility; or a bootable utility that boots from removable media such as a CD or DVD, or from an external drive such as an external hard drive, a flash memory card, USB drive, or the like.

The layered environment manager 150 may receive an environment modification 170 from an environment update service 160. Environment modifications 170 may be delivered via physical media, a network, or the like. The layered environment manager 150 may utilize one or more layered environment data store(s) 180 to store configuration files, layer activation data, or the like. In various embodiments, the layered environment data store(s) 180 may be located on a network, in the BIOS of the local computer 110, in nonvolatile memory provided for storing configuration data, such as the third-party data store in the Intel® vPro™ architecture, or in a hypervisor, such as VMware™, Oracle VM™, or Xen.

Many of the functional units described in this specification have been explicitly labeled as components or modules, in order to more particularly emphasize their implementation independence. Others are assumed to be components or modules. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices or the like.

Components and modules may also be implemented in software for execution by various types of processors. An identified component or module of executable code may, for instance, comprise one or more physical or logical blocks of computer instructions which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. The executable code may be stored on one or more computer readable media. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
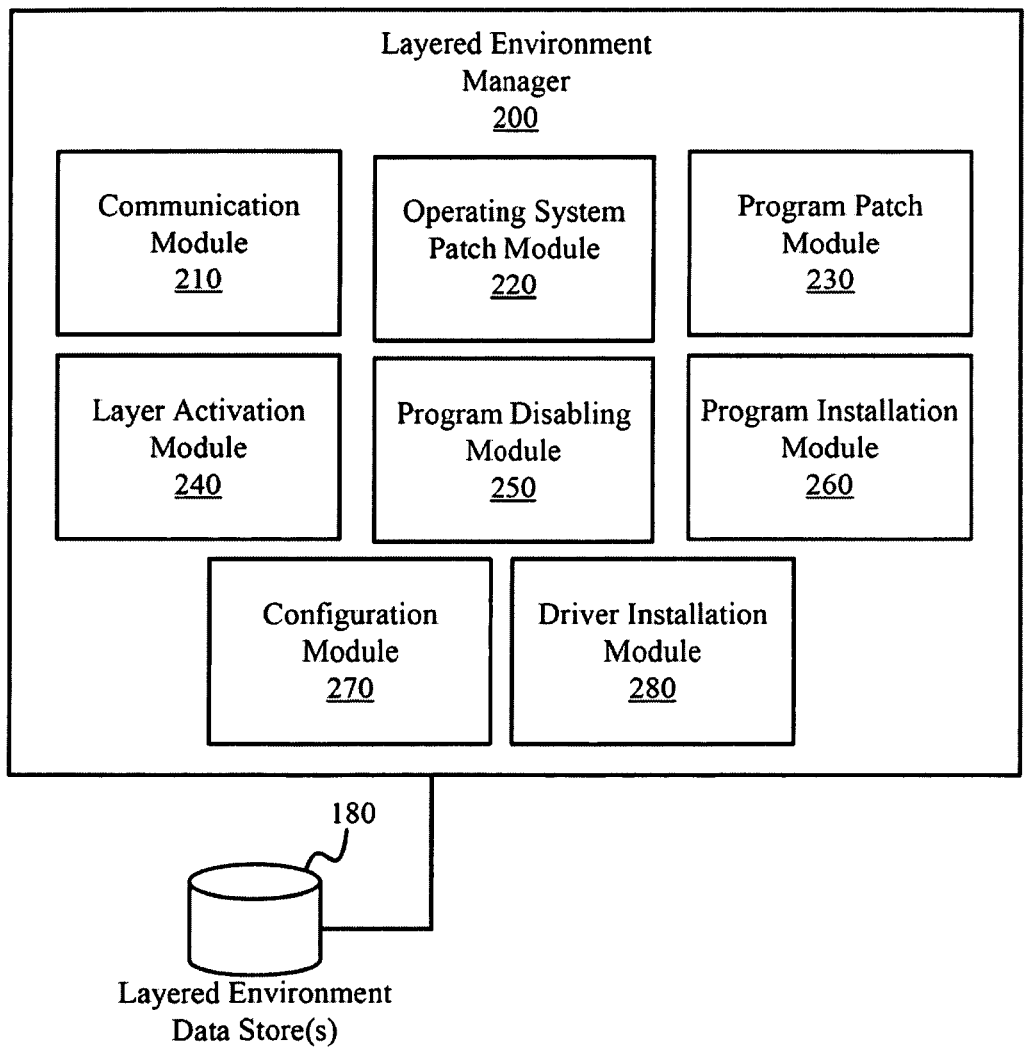
FIG. 2 illustrates components of one embodiment of a layered environment manager.

FIG. 2 illustrates one embodiment of components of a layered environment manager 200 in accordance with certain embodiments. The layered environment manager 200 is one embodiment of the layered environment manager 150 depicted in FIG. 1. As shown, the layered environment manager 200 may include or be in communication with the layered environment data store(s) 180 depicted in FIG. 1. In addition, the layered environment manager 200 may include a communication module 210, an operating system patch module 220, a program patch module 230, a layer activation module 240, a program disabling module 250, a program installation module 260, a configuration module 270, and a driver installation module 280. The layered environment manager 200 facilitates pre-boot management of the layered execution environment 130.

The communication module 210 communicates between the layered environment manager 200 and other components of the computing system 100. For example, the communication module 210 may receive the environment modification 170 from the environment update service 160. The communication module 210 may store layer configuration data in the layered environment data store(s) 180.

Additional modules of the layered environment manager 200 may be provided to perform the various types of environment modifications 170. The operating system patch module 220 may apply operating system patches to the base operating environment 120. The program patch module 230 may apply program patches to programs in execution layers 140 of the layered execution environment 130. The layer activation module 240 may modify configuration settings of the layered environment data store(s) 180 to activate or deactivate execution layers 140 of the layered execution environment 130.

The program disabling module 250 may disable a program in execution layers 140 of the layered execution environment 130. Programs may be disabled, for example, when they contain incompatibilities with the base operating environment 120 or other components of the local computer 110, or with each other. The program installation module 260 may install a program or replace an existing program in an execution layer 140 of the layered execution environment 130. The configuration module 270 may modify configuration settings in the layered environment data store(s) 180 or other configuration data stores of the local computer 110. The driver installation module 280 may install a driver for use by the layered execution environment 130 or programs therein.

Figure 3:
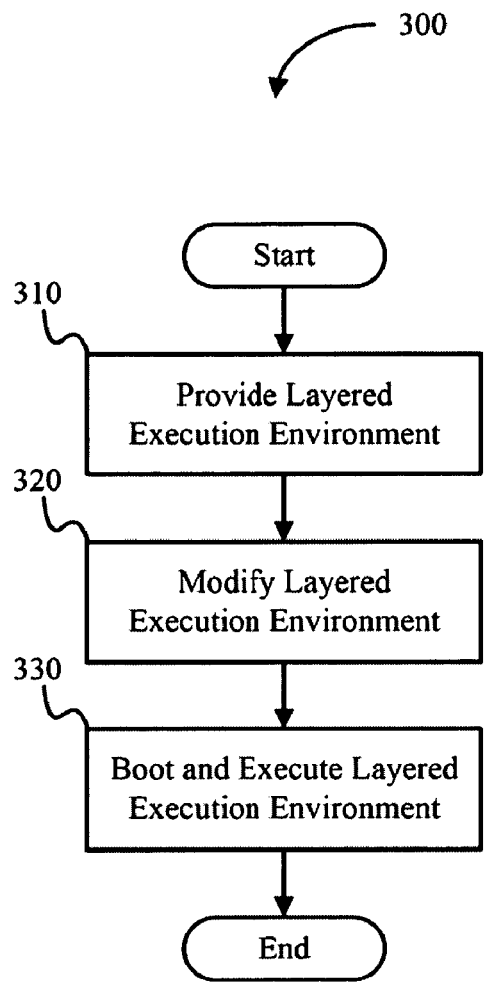
FIG. 3 illustrates components of one embodiment of a layered execution environment management method.
Figure 4:
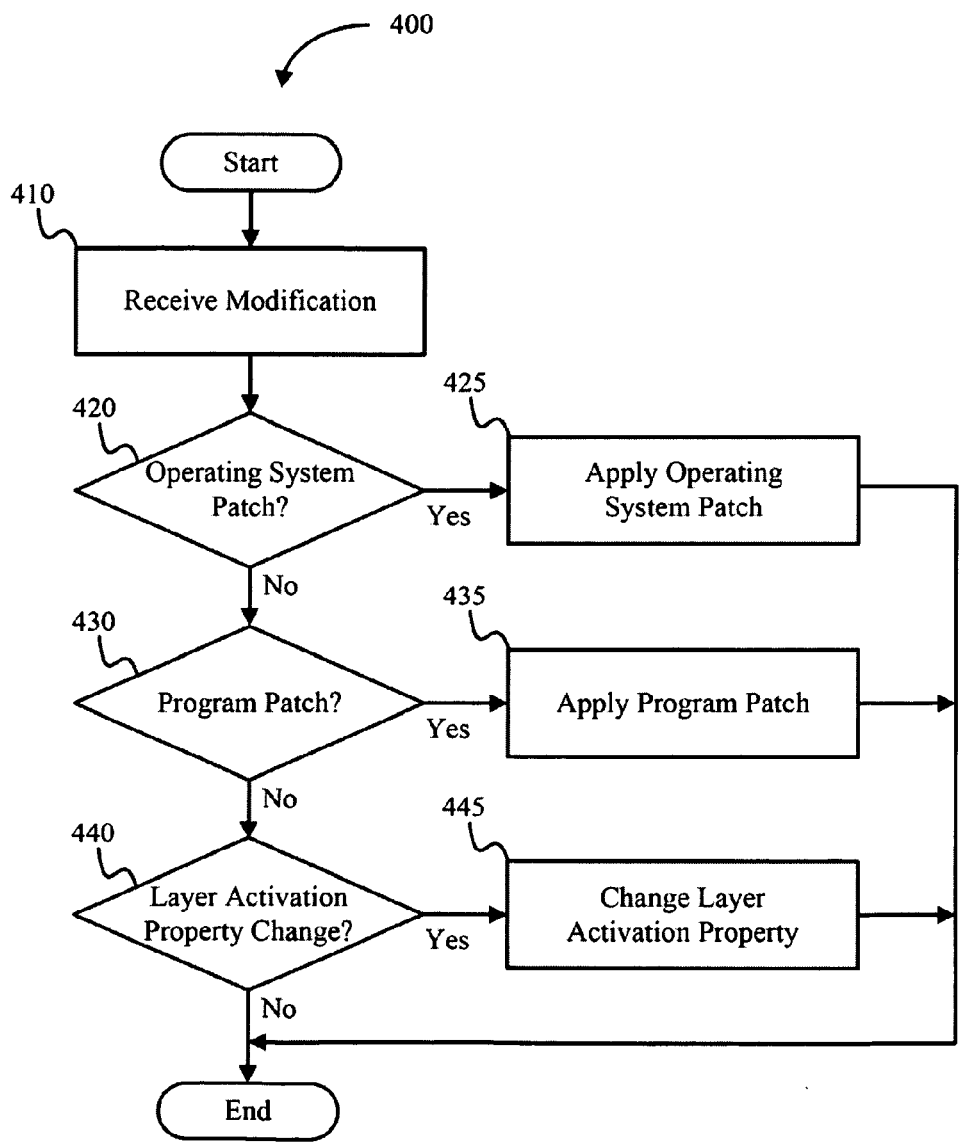
FIG. 4 illustrates components of one embodiment of a layered environment modification method.
Figure 5:
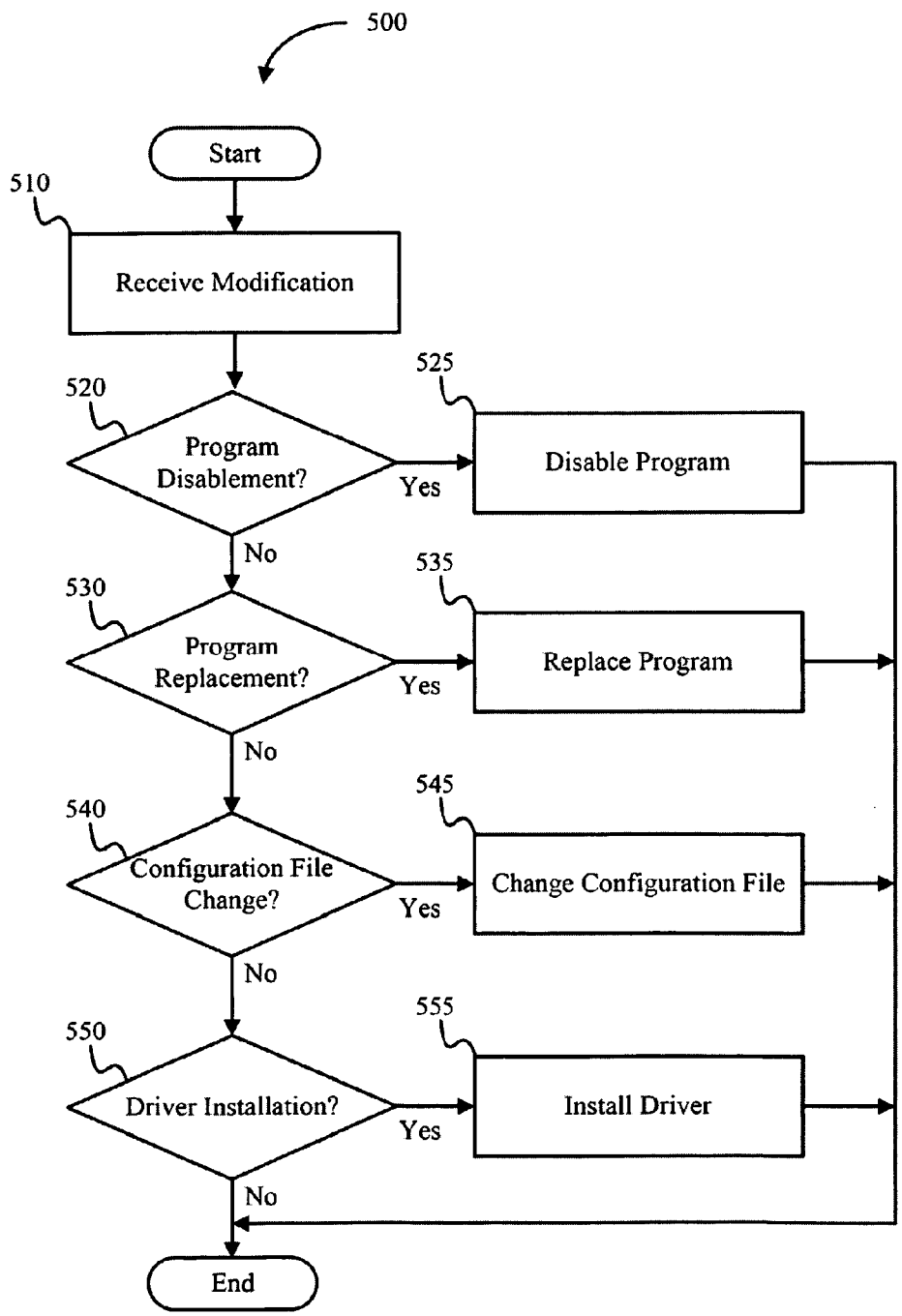
FIG. 5 illustrates components of a second embodiment of a layered environment modification method.

FIGS. 3-5 are flowchart diagrams illustrating components of an embodiment of a layered execution environment management method, and two embodiments of a layered environment modification method. While FIGS. 3-5 illustrate acts according to certain embodiments, other embodiments may omit, add to, reorder, and/or modify any of the acts shown in FIGS. 3-5.

FIG. 3 illustrates one embodiment of a layered environment management method 300. As depicted, the layered environment management method 300 includes a provide layered execution environment operation 310, a modify layered execution environment operation 320, and a boot and execute layered execution environment operation 330. The layered environment management method 300 facilitates management and operation of a layered execution environment 130.

The provide layered execution environment operation 310 provides a layered execution environment 130. The provide layered execution environment operation 310 may provide an application virtualization environment in which applications are encapsulated from the underlying operating system. The layered execution environment 130 may include a virtualization layer that intercepts and transparently redirects operations such as file I/O to, for example, eliminate conflicts between applications.

The modify layered execution environment operation 320 may modify the layered execution environment 130, the base operating environment 120, programs installed in the layered execution environment, or the layered environment data store(s) 180. The modify layered execution environment operation 320 may receive an environment modification 170 from an environment update service 160. Modifications performed by the modify layered execution environment operation 320 may include applying an operating system patch, applying a program patch, changing a layer activation property, disabling a program, replacing a program, changing a configuration file, or installing a driver.

The boot and execute layered execution environment operation 330 starts the layered execution environment 130. In one embodiment, the boot and execute layered execution environment operation 330 boots the local computer 110 and automatically begins execution of the layered execution environment 130 as part of the start-up process of the base operating environment 120. The layered execution environment 130 may also be started manually or automatically after the base operating environment 120 has finished booting.

FIG. 4 illustrates one embodiment of a layered environment modification method 400. The layered environment modification method 400 is one embodiment of the modify layered execution environment operation 320 depicted in FIG. 3. As depicted, the layered environment modification method 400 includes a receive modification operation, an operating system patch test 420, an apply operating system patch operation 425, a program patch test 430, an apply program patch operation 435, a layer activation property change test 440, and a change layer activation property operation 445. The layered environment modification method 400 facilitates modification of the layered execution environment 130, or programs installed therein.

The receive modification operation 410 may receive an environment modification 170 from an environment update service 160. The environment modification 170 may be received via a network, read from physical media, or the like.

The operating system patch test 420 determines whether the environment modification 170 received by the receive modification operation 410 is an operating system patch. If the environment modification 170 is an operating system patch, the layered environment modification method 400 continues with the apply operating system patch operation 425. Otherwise, the layered environment modification method 400 continues with the program patch test 430.

The apply operating system patch operation 425 may apply a patch to the base operating environment 120 or to the layered execution environment 130 without booting either the base operating environment 120 or layered execution environment 130. The apply operating system patch operation 425 may, for example, facilitate installation of operating system security patches without making the operating system vulnerable to a security breach by booting it. The apply operating system patch operation 425 may facilitate repairing an operating system bug that prevents the operating system from booting.

The program patch test 430 determines whether the environment modification 170 received by the receive modification operation 410 is a program patch. If the environment modification 170 is a program patch, the layered environment modification method 400 continues with the apply program patch operation 435. Otherwise, the layered environment modification method 400 continues with the layer activation property change test 440.

The apply program patch operation 435 may patch a program in an execution layer 140 of the layered execution environment 130 without booting the base operating environment 120 or layered execution environment 130. Applying a program patch without booting the base operating environment 120 or layered execution environment 130 facilitates management of the local computer 110 by IT personnel without providing access to potentially sensitive data on the local computer 110.

The layer activation property change test 440 determines whether the environment modification 170 received by the receive modification operation 410 is a layer activation property change. If the environment modification 170 is a layer activation property change, the layered environment modification method 400 continues with the change layer activation property operation 445. Otherwise, the layered environment modification method 400 ends.

The change layer activation property operation 445 may activate or deactivate an execution layer 140 of the layered execution environment 130. An execution layer 140 may contain configuration data, an operating system patch, or driver that would be beneficial for the operating system to have access to at startup. An execution layer 140 may also contain sensitive data that beneficially should not be available at startup. The change layer activation property operation 445 may control access to execution layers 140 by modifying layer configuration settings in the layered environment data store(s) 180.

FIG. 5 illustrates components of a second embodiment of a layered environment modification method 500. The layered environment modification method 500 is one embodiment of the modify layered execution environment operation 320 depicted in FIG. 3. The layered environment modification method 500 may include components of the layered environment modification method 400. In the depicted embodiment, the layered environment modification method 500 includes a receive modification operation 510, a program disablement test 520, a disable program operation 525, a program replacement test 530, a replace program operation 535, a configuration file change test 540, a change configuration file operation 545, a driver installation operation 550, and an install driver operation 555. The layered environment modification method 500

The receive modification operation 510 may receive an environment modification 170 from an environment update service 160. The environment modification 170 may be received via a network, or read from physical media.

The program disablement test 520 determines whether the environment modification 170 received by the receive modification operation 510 is a program disablement. If the environment modification 170 is a program disablement, the layered environment modification method 500 continues with the disable program operation 525. Otherwise, the layered environment modification method 500 continues with the program replacement test 530.

The disable program operation 525 may disable a program in an execution layer 140 of the layered execution environment 130. Disabling a program facilitates denying access to the program by a user, the base operating environment 120, or layered execution environment 130 without deactivating the execution layer 140. Other programs or data contained in the execution layer 140 may remain available.

The program replacement test 530 determines whether the environment modification 170 received by the receive modification operation 510 is a program replacement. If the environment modification 170 is a program replacement, the layered environment modification method 500 continues with the replace program operation 535. Otherwise, the layered environment modification method 500 continues with the configuration file change test 540.

The replace program operation 535 replaces a program in an execution layer 140 of the layered execution environment 130. Replacing a program may be used to update a program to a more recent version or to reinstall a program that has been corrupted. Program patches to repair program bugs would typically be applied by the apply program patch operation 435.

The configuration file change test 540 determines whether the environment modification 170 received by the receive modification operation 510 is a configuration file change. If the environment modification 170 is a configuration file change, the layered environment modification method 500 continues with the change configuration fie operation 545. Otherwise, the layered environment modification method 500 continues with the driver installation test 550.

The change configuration file operation 545 may change a configuration file in the layered environment data store(s) 180, the registry or file system of the base operating environment 120, or an execution layer 140 of the layered execution environment 130. Changing a configuration file facilitates modifying the operation of the base operating environment 120 or layered execution environment 130 without booting. A configuration file change may, for example, cause a defective driver or program that is causing a boot failure of the base operating system 120 from being executed.

The driver installation test 550 determines whether the environment modification 170 received by the receive modification operation 510 is a driver installation. If the environment modification 170 is a driver installation, the layered environment modification method 500 continues with the install driver operation 555. Otherwise, the layered environment modification method 500 ends.

The install driver operation 555 may install a driver in the base operating environment 120 or an execution layer 140 of the layered execution environment. A driver may be installed to update an existing driver to a more recent version, or to facilitate access to a hardware or peripheral resource by the base operating system 120 or programs in the layered execution environment 130.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. For example, one of skill in the art would appreciate that other operating environment modifications that are not described herein may be enabled by the means and methods described herein. The above description and accompanying drawings are accordingly to be regarded in an illustrative rather than a restrictive sense.

What is claimed is:

1. A system comprising:
    a local computer, configured to execute a base operating environment comprising an operating system and a plurality of applications;
    a layered execution environment, configured to operate over the base operating environment of the local computer, the layered execution environment further configured to install at least one application to be run on the base operating environment such that the base operating environment is not modified; and
    a layered environment manager configured to modify the layered execution environment without booting or executing the layered execution environment or the base operating environment to provide a modified layered execution environment.

2. The system of claim 1, wherein the layered environment manager is further configured to conduct a modification action selected from the group consisting of applying an operating system patch, applying a program patch, and changing a layer activation property.

3. The system of claim 1, wherein the layered environment manager is further configured to conduct a modification action selected from the group consisting of disabling a program, replacing a program, changing a configuration file, and installing a driver.

4. The system of claim 1, wherein the layered environment manager is a BIOS-based utility.

5. The system of claim 1, wherein the layered environment manager is a bootable utility that boots from an external drive.

6. The system of claim 1, wherein at least a portion of the layered execution environment is stored external to the local computer.

7. The system of claim 1, wherein the layered execution environment is stored entirely within the local computer.

8. A method comprising:
   providing a layered execution environment comprising at least one layer that operates over a base operating environment of a local computer and is used for installing at least one application to be run on the base operating environment such that the base operating environment is not modified;
   modifying the layered execution environment without booting or executing the layered execution environment or the base operating environment to provide a modified layered execution environment; and
   booting and executing the modified layered execution environment.

9. The method of claim 8, wherein modifying the layered execution environment comprises conducting a modification action selected from the group consisting of applying an operating system patch, applying a program patch, and changing a layer activation property.

10. The method of claim 8, wherein modifying the layered execution environment comprises conducting a modification action selected from the group consisting of disabling a program, replacing a program, changing a configuration file, and installing a driver.

11. The method of claim 8, wherein modifying the layered execution environment comprises executing a BIOS-based utility.

12. The method of claim 8, wherein modifying the layered execution environment comprises executing a bootable utility that boots from an external drive.

13. The method of claim 8, wherein at least a portion of the layered execution environment stored external to the local computer.

14. The method of claim 8, wherein the layered execution environment is stored entirely within the local computer.

15. An apparatus comprising:
   a communication module configured to receive a modification for a layered execution environment configured to operate over a base operating environment of a local computer; and
   a modification module configured to modify the layered execution environment without booting or executing the layered execution environment or the base operating environment, to provide a modified layered execution environment.

16. The apparatus of claim 15, further comprising a layer activation store configured to store layer activation properties.

17. The apparatus of claim 15, wherein modifying the layered execution environment comprises conducting a modification action selected from the group consisting of applying an operating system patch, applying a program patch, changing a layer activation property, disabling a program, replacing a program, changing a configuration file, and installing a driver.

18. The apparatus of claim 15, wherein modifying the layered execution environment comprises executing a BIOS-based utility.

19. The apparatus of claim 15, wherein the layered environment manager is a bootable utility that boots from an external drive.

20. The apparatus of claim 15, wherein at least a portion of the layered execution environment is stored external to the local computer.

* * * * *